United States Patent
Mitsui

(10) Patent No.: US 7,908,609 B2
(45) Date of Patent: Mar. 15, 2011

(54) INFORMATION PROCESSING APPARATUS WITH DEVICE DRIVER INSTALLATION CONTROL

(75) Inventor: Akihiro Mitsui, Kawasaki (JP)

(73) Assignee: Canon Kabushiki Kaisha (JP)

(*) Notice: Subject to any disclaimer, the term of this patent is extended or adjusted under 35 U.S.C. 154(b) by 1185 days.

(21) Appl. No.: 11/549,757

(22) Filed: Oct. 16, 2006

(65) Prior Publication Data

US 2007/0136485 A1     Jun. 14, 2007

(30) Foreign Application Priority Data

Oct. 18, 2005  (JP) .................... 2005-303710

(51) Int. Cl.
*G06F 13/00*    (2006.01)
(52) U.S. Cl. .......... 719/321; 719/327; 717/174; 717/176
(58) Field of Classification Search .................. 719/321, 719/327; 717/174, 176
See application file for complete search history.

(56) References Cited

U.S. PATENT DOCUMENTS

| 7,316,022 | B2 | 1/2008 | Nishio | |
| 2004/0003135 | A1* | 1/2004 | Moore | 709/321 |
| 2006/0253617 | A1* | 11/2006 | Lin et al. | 710/8 |

FOREIGN PATENT DOCUMENTS

| JP | 2000-132361 A | 5/2000 |
| JP | 2003-006133 A | 1/2003 |
| JP | 2005-258895 A | 9/2005 |

OTHER PUBLICATIONS

Brodeur et al, "Plug and Play for Network Connected Devices", Window Device Experience Group, Microsoft Corporation, Oct. 18, 2006.
Beatty, et al, "Web Service Dynamic Discovery (WS-Discovery)", Apr. 2005, pp. 1-42.
Office Action issued in corresponding Japanese Patent Application No. 2005-303710 dated Oct. 29, 2010.

* cited by examiner

*Primary Examiner* — Andy Ho
(74) *Attorney, Agent, or Firm* — Rossi, Kimms & McDowell LLP

(57) ABSTRACT

When a device on a network is detected with network plug and play and its driver is installed, a function installed by the device information is uniquely decided. The high priority device function is selected based on information of client and the device function is automatically decided with network plug and play based on the selection of the high priority device function to install the driver. In this situation, a criterion can be selected by a user among most installed criterion, recently installed criterion, currently installed criterion, etc.

36 Claims, 19 Drawing Sheets

FIG. 11

| APPLICATION NAME | PDL NAME |
|---|---|
| A.exe | PDL1 |
| B.exe | PDL2 |

| SPOOL SIZE | PDL NAME |
|---|---|
| 5MB | PDL1 |
| 3MB | PDL2 |
| 4MB | PDL3 |

```
<soap:Envelope ....>
   <soap:Header>
      < ... >
   </soap:Header>
   <soap:Body>
1401 ──── <wsd:Probe>
1402 ──── <wsd:Types>i:PrintBasic</wsd:Types>
         <wsd:Scopes
         MatchBy="http://schemas.xmlsoap.org/ws/2005/04/discovery/ldap">
            ldap:///ou=engineering,o=examplecom,c=us
         </wsd:Scopes>
      </wsd:Probe>
   </soap:Body>
</soap:Envelope>
```

FIG. 15

```
<soap:Envelope ....>
  <soap:Header>
    < ... >
  </soap:Header>
  <soap:Body>
      <wsd:ProbeMatches>
        <wsd:ProbeMatch>
          <wsa:EndpointReference>
            <wsa:Address>
              uuid:98190dc2-0890-4ef8-ac9a-5940995e6119     ← 1501
            </wsa:Address>
          </wsa:EndpointReference>
          <wsd:Types>i:PrintBasic  i:PrintAdvanced</wsd:Types>     ← 1502
          <wsd:Scopes>
             ldap:///ou=engineering,o=examplecom,c=us
             ldap:///ou=floor1,ou=b42,ou=anytown,o=examplecom,c=us
             http://itdept/imaging/deployment/2004-12-04
          </wsd:Scopes>
          <wsd:XAddrs>http://prn-example/PRN42/b42-1668-a</wsd:Addrs>
          <wsd:MetadataVersion>75965</wsd:MetadataVersion>     ← 1503
        </wsd:ProbeMatch>
      </wsd:ProbeMatches>
  </soap:Body>
</soap:Envelope>
```

FIG. 16

```
<soap:Envelope ....>
  <soap:Header>
    < ... >
  </soap:Header>
  <soap:Body>
        <wsx:GetMetadata>
            <wsx:Dialect>http://schemas.xmlsoap.org/ws/2004/09/policy</wsx:Dialect>
        </wsx:GetMetadata>
  </soap:Body>
</soap:Envelope>
```

FIG. 17

```
<soap:Envelope ....>
<soap:Header>
 < ... >
</soap:Header>
<soap:Body>
  <wsx:Metadata>                                                           — 171
    <wsx:MetadataSection
     Dialect="http://schemas.xmlsoap.org/ws/2004/08/devprof/ThisModel">    — 1701
      <wsdp:ThisModel>
        <wsdp:manufacturer>ACME Manufacturing</wsdp:manufacturer>          — 1702
        <wsdp:modelName xml:lang="en-GB">ColorBeam 9</wsdp:modelName>      ⎫
        <wsdp:modelName xml:lang="en-US">ColorBeam 9</wsdp:modelName>      ⎬ — 1703
      </wsdp:ThisModel>                                                    ⎭
    </wsx:MetadataSection>
  </wsx:Metadata>
</soap:Body>
</soap:Envelope>
```

FIG. 18

| PRINTER DRIVER NAME | PDL NAME |
|---|---|
| PRINTER DRIVER A | PDL1 |
| PRINTER DRIVER B | PDL2 |
| PRINTER DRIVER C | PDL1 |
| PRINTER DRIVER D | PDL3 |
| PRINTER DRIVER E | PDL1 |

INFORMATION PROCESSING APPARATUS WITH DEVICE DRIVER INSTALLATION CONTROL

BACKGROUND OF THE INVENTION

1. Field of the Invention

The present invention relates to an information processing apparatus providing information about a function of a network device including an image forming apparatus having a plurality of image forming means.

2. Description of the Related Art

With expansion of networks such as the Internet or home network, user interactive devices such as PDAs and cellular phones and imaging apparatuses such as digital cameras scanners, printers and copiers have been developed to support the networks. Further, various devices such as televisions, air conditioners or refrigerators have been also developed to support the networks.

Accordingly, a large number of functions are present for enhancing ease-of-use and simplicity in using the network supporting devices. One of the functions is network plug and play function. The conventional plug and play (PnP) is a function operating when devices and a PC that is a host computer are directly plug-connected to various local I/O ports (serial, parallel, USB, PCI, IEEE1394, PCMCIA, etc.). In plug and play, the device sends the device type (device ID), manufacturer name (vender ID), serial number, etc. to an information processing apparatus in the host. The information processing apparatus refers to the received information and automatically installs the device driver on a client computer to enable the client computer to use the device. Such a technique has been dominantly used. The network plug and play extends this to connections between NCDs (Network Connected Devices) and the host computers. Standards such as PnP-X (Plug and Play extensions) proposed by Microsoft Corporation, BMLinks promoted by JBMIA (Japan Business Machine and Information System Industries Association) or Bonjour developed by Apple Computer, Inc. are now provided.

PnP-X is a function which can detect a device on the network and install a device driver corresponding to the device, based on function information provided by the device compatible with WS-Discovery, in addition to the conventional plug and play. The WS-Discovery is a device detecting protocol for UPnP® 1.0 (Universal PnP) or WSD (Web Service for Devices) (see J. Beaty, et al, "Web Service Dynamic Discovery (WS-Discovery)," April 2005. The function information is information specifying a function or a service provided by a device.

An operating system having the PnP-X function achieves detection of network devices having various protocols by the system combining function discovery with function discovery provider. The function discovery is a function discovery client relating to an application layer. The function discovery provider relates to a protocol layer. An "IP bus enumerator" that is a function discovery client receives a notification from each function discovery provider responding to the function information of UPnP or WSD of the devices connected to the network and lists the found device information. The listed device information (including device IDs, vender IDs, etc.) is passed from the "IP bus enumerator" to a "plug and play manager". Then, installation of the driver corresponding to the device information is started.

Further, the PnP-X function has a system for preventing that all drivers of the found devices which are connected to the network are installed. This is achieved by an "Association Database" and a user interface of a control panel referred to as "add/delete network device" that is another function discovery client. The "add/delete network device" obtains information from the function discovery provider and lists the devices which are currently found, to display the list with the user interface. A user starts the "add/delete network device" and selects the "installation allowed" devices among the listed devices and registers the device information of the selected devices to the "association database" by an "add" operation. The "IP bus enumerator" passes only the devices registered in the "association database" among the found network devices to the "plug and play manager". By this process, it is prevented that the drivers for all devices found on the network are installed (see "Discovery, Plug and Play Integration, and Web Services for Network connected Devices", Apr. 25, 2005.

Systems, such as a system having the PnP-X function, are conventionally provided in which a host computer connected to devices via a network installs programs based on response information from the devices (see Japanese Patent Application Laid-Open No. 2003-6133).

SUMMARY OF THE INVENTION

However, in the above described related art, when a device having a plurality of functions is detected, device drivers corresponding to the respective functions are installed and any of the installed device drivers can be used. Therefore, selecting the appropriate driver may be difficult for the user. For example, if an image forming apparatus (e.g., a printer) supporting multiple types of PDLs (Page Description Languages) is detected by a client computer, printer drivers corresponding to respective types of PDLs supported by the image forming apparatus are installed on the client computer. As a result, a plurality of options for output destination which can be specified by the user are present for one printer. Therefore, the user cannot decide which driver should be selected in actual printing, which causes reduction in ease-of-use.

Further, as described above, the devices detected on the network are listed as a list on a client computer and the user can select the devices from the list to add them as the available devices. If a printer supporting a plurality of PDLs is detected, the drivers which can be installed on the client computer are displayed for each PDL in the list. However, the normal user does not know which PDL should be selected, even if viewing such a list. Thus, in the end, the user selects all device drivers or selects any drivers without apparent reason. In the former case, all drivers of the detected devices are installed. In the latter case, it can occur that the user selects the printer drivers corresponding to the PDLs which are not suitable to data created by the application program used by the user and the user can not output desired images.

The present invention is provided in view of the above described conventional examples and it is an object of the present invention to achieve user assistance for selecting a suitable device driver when selecting the device driver to be installed in a computer. It is also an object of the present invention to enhance user operability, ease-of-use and productivity by selecting and installing the device driver of the device suitable to the user with the user assistance. Further, the present invention prevents waste of computer resources due to installation of the device drivers which are not desired by the user.

To accomplish the above described objects, the present invention comprises the following configuration: an information processing apparatus which can communicate with a peripheral device supporting a plurality of types of device drivers, the apparatus comprising:

a recognition unit, adapted to recognize installation log information of device drivers retained;

a specification unit, adapted to specify function information which is a target for installation, by analyzing function information corresponded to installed device driver information which is included in the installation log information of the device drivers recognized by the recognition unit;

a decision unit, adapted to decide the device driver to be installed among a plurality of types of the device drivers supporting the peripheral device, based on the function information specified by the specification unit; and an installation control unit, adapted to control so that the device driver decided by the decision unit is installed.

By the present invention, the user assistance can be achieved for selecting the suitable device when selecting the device driver to be installed to the computer. Further, by selectively installing the device driver of the device suitable to the user, user operability, ease-of-use and productivity can be enhanced. Further, waste of computer resources due to installation of the device drivers can be prevented.

Further features of the present invention will become apparent from the following description of exemplary embodiments (with reference to the attached drawings).

BRIEF DESCRIPTION OF THE DRAWINGS

FIG. 11 is a view of a database of "optimal driver for currently used application" among the priority setting items of the priority installation, as an embodiment of the present invention;

FIG. 12 is a view showing an example of a database of "driver providing a low load on the network" among the priority setting items of the priority installation, as an embodiment of the present invention;

FIG. 14 is a view showing a sample of Probe message of WS-Discovery in SOAP, as an embodiment of the present invention;

FIG. 15 is a view showing a sample of ProbeMatch message of WS-Discovery in SOAP, as an embodiment of the present invention;

FIG. 16 is a view showing a sample of GetMetadata message of Device Profile for Web Services in SOAP, as an embodiment of the present invention;

FIG. 17 is a view showing a sample of metadata message of Device Profile for Web Services in SOAP, as an embodiment of the present invention; and FIG. 18 is a view showing an example of the relation between a printer driver and a page description language.

DESCRIPTION OF THE EMBODIMENTS

First Embodiment

<System Configuration>

Figure 1:
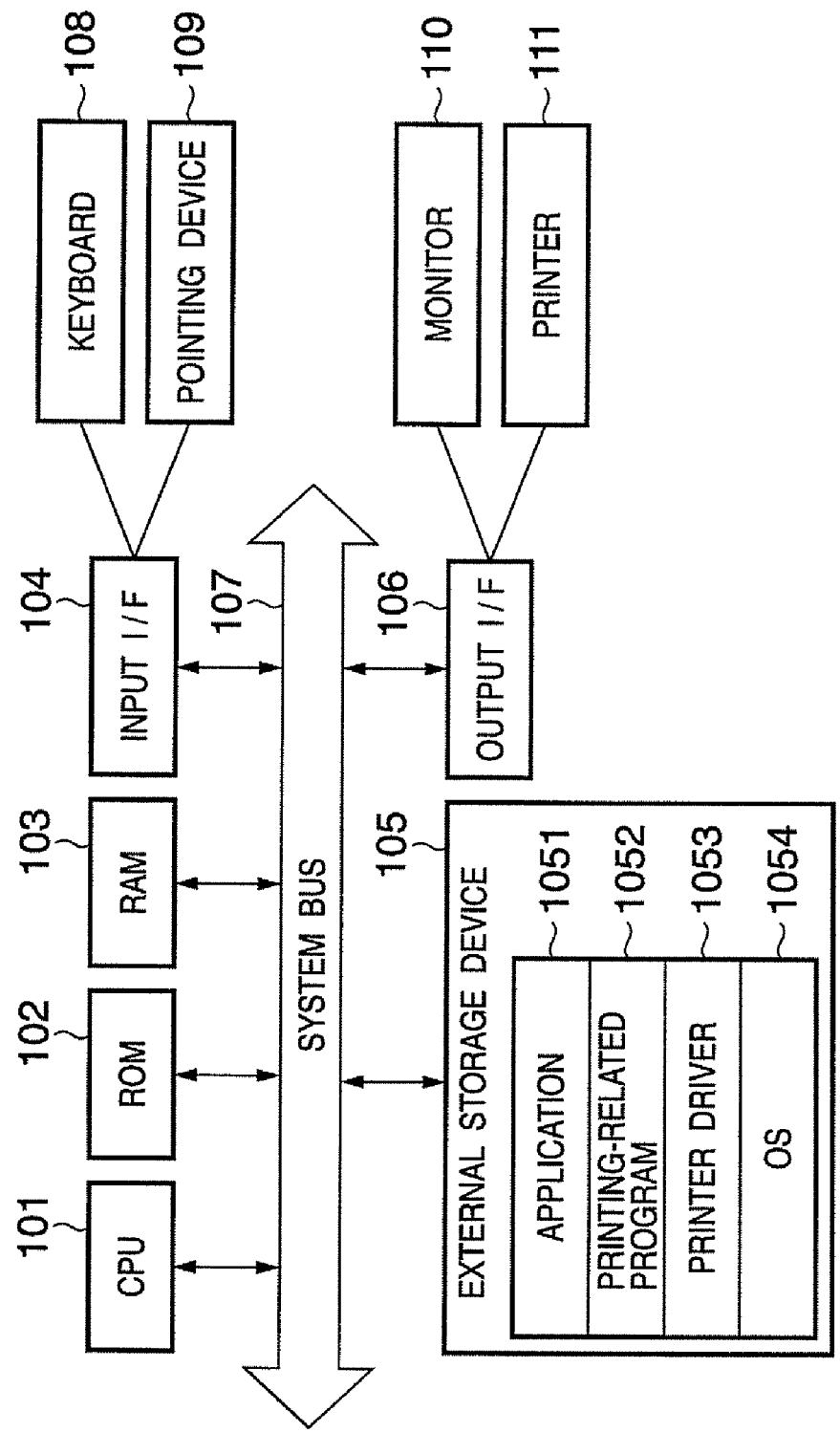
FIG. 1 is a block view illustrating a configuration of a system including a computer, as an embodiment of the present invention.

FIG. 1 is a block configuration view of a general purpose computer (information processing apparatus) such as a client or a server which is included in a print processing system, showing an embodiment of the present invention. In this embodiment, a network printer will be explained. Unless otherwise stated, the present invention is applicable to a standalone function, a system comprising a plurality of devices, or a system in which connection and processing are performed via a network such as a LAN or a WAN, as long as functions of the present invention are implemented.

In FIG. 1, a CPU 101 controls the entire apparatus in accordance with a program stored in a ROM 102, a RAM 103 or a storage device 105. The RAM 103 is also used as a work area in performing various processes. In the external storage device 105, an operating system (OS) 1054, a printer driver 1053, a printing-related program 1052, an application soft 1051, etc. are recorded. In the operating system 1054, a TCP/IP protocol stack and modules for network PnP as shown in FIG. 3 are here included.

Input devices, for example a keyboard 108 and a pointing device 109 such as a mouse, are devices with which a user provides various instructions to a computer through an input I/F 104. An output I/F 106 is an interface for outputting data to the outside and outputs data to a monitor 110 or a printer 111. With display on the monitor 110 and virtual switches mapped on the display screen or the like, a GUI is realized. The printer and the computer may be connected via a network instead of a local I/O. Further, a common data bus 107 allows exchange of data, control signals, addresses, etc. between the hardware components.

Figure 2:
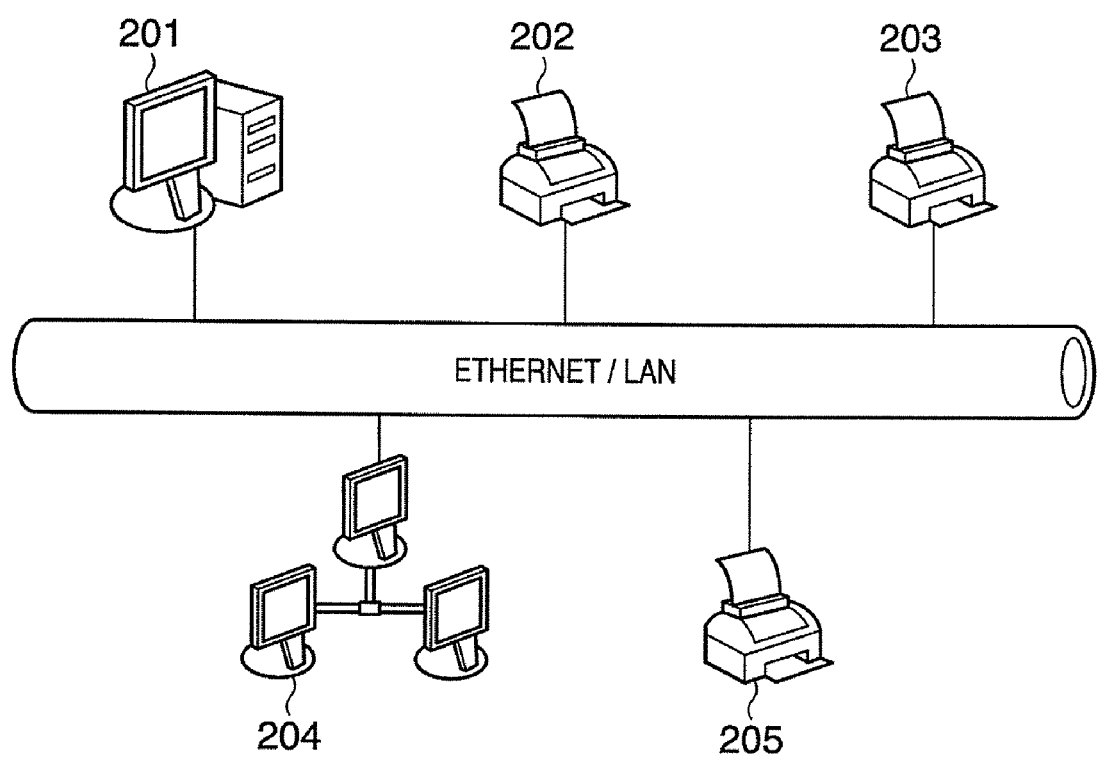
FIG. 2 is a simplified view of a network printing environment in which computers and printers are connected via a network, as an embodiment of the present invention.

FIG. 2 is a simplified view showing an example of a network environment in an embodiment of the present invention. A printer 202, a printer 203 and a printer 205 denote network printers connecting to an Ethernet (R) network. A client 201 and a server 204 are also connected to the network to construct an environment which enables printing from the client 201 or the server 204 via the network. The printer 203 is here offline and therefore can not be actually used although it is physically connected to the network. Such offline printers may be present on the network. In the present invention, it is assumed that the printers can be used in the network as shown in FIG. 2. The client 201 has the hardware shown in FIG. 1.

Figure 3:
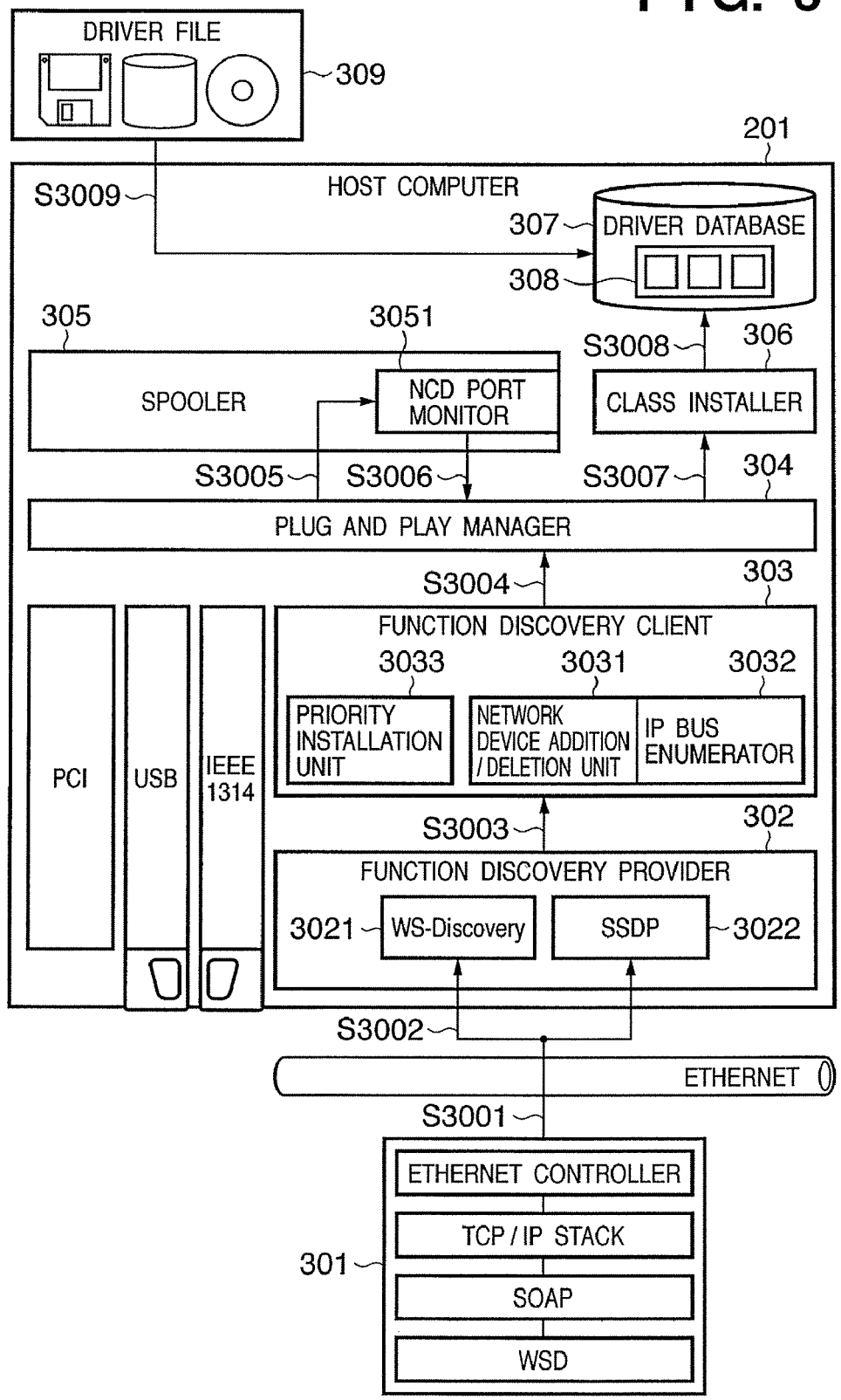
FIG. 3 is a block view illustrating the entire system configuration of network plug and play, as an embodiment of the present invention.

FIG. 3 is a block view of network plug and play on a host computer, in an embodiment of the present invention. It will be explained how the network plug and play operates, starting from the bottom in FIG. 3. Firstly, a printer 301 is present which is connected to the network as shown in FIG. 2. The printer 301 corresponds to the printers 202, 203 and 205 in FIG. 2. The printer 301 incorporates an Ethernet® controller as a communication function to be compatible with Ethernet®. Additionally, the printer 301 is equipped with a TCP/IP protocol stack and an HTTP layer so as to operate in response to HTTP requests on a TCP/IP network. Although Ethernet® is here used as a communication medium, any medium may be employed which can support TCP/IP used in this embodiment as an upper protocol. For example, the medium may be also applicable to serial I/Os such as USB, WiFi® (IEEE 802.11a/b/g), Bluetooth®, wireless communications such as UWB, serial IF or parallel IF. In addition, communication protocols other than TCP/IP may be employed.

In an upper layer of the communication function that the printer 301 has, a system is provided which can interpret an XML-based protocol "SOAP (Simple Object Access Protocol)" that is a markup language with tags. SOAP is a protocol which uses XML for communication content and can communicate with data independently of languages and platforms. Based on the SOAP, the printer 301 is also provided with a WSD (Web Services for Devices) system. The WSD system is present for the purpose of allowing the printer 301 to provide Web function information. The device sends back a response with device information, by means of DPWS (Device Profile for Web Services) that is an application protocol for returning device information. The client 201 supports WS-Discovery (Web Services Dynamic Discovery) in order to search Web function information of the device. The client 201 also supports two standards for WS-MetadataExchange that is a data format for including device information (see FIG. 13). By supporting these two standards to link to WSD and DPWS provided in the device, network PnP is realized.

Additionally, the printer 301 is provided with WSD function information. This may be UPnP function information which supports SSDP (Simple Service Discovery Protocol) and SSDP Discovery Metadata Mapping.

<Search and Installation of Devices>

Next, a procedure in which a client detects network devices and installs required software will be explained.

The printer 301 connected to Ethernet (R) sends a notification of connection (Hello message) in multicast to the network, upon connecting to the network such as Ethernet (R) (S3001). The destination of the multicast is the host computer or a node including at least the host computer. The client 201 connected to the network receives the Hello message at a WS-Discovery provider 3021 through a TCP/IP protocol stack and an HTTP driver (S3002). The WS-Discovery provider 3021 is one of the providers which belong to a function discovery provider 302 for managing device detection on the network. The client 201 is the host computer having the network plug and play function.

Then, the WS-Discovery provider 3021 sends a GetMetadata message (see FIG. 16) to the printer 301, as required. Upon receiving the message, the printer 301 sends back a GetMetadata Response message including metadata in which the printer's own device information is included, in accordance with WS-MetadataExchange. The metadata includes a device ID, a model name, a manufacturer name, a URL address of the device, PDL information and so on. An example of the device information is shown in FIG. 17. In the device information in FIG. 17, a model name 1703, a manufacturer name 1702 and a device URL address 1701 are described. Additionally, PDL information may be included as function information provided by the device. The PDL information may be obtained from the device as function information, separately from the device information.

If the client 201 searches a WSD compatible device which is already connected to the network, the client 201 sends Probe messages (see FIG. 14) with a fixed timing in multicast to the network. The fixed timing means, for example, a fixed polling interval when the user directs a search on starting of the host computer. Upon receiving the Probe, the printer 301 sends ProbeMatch (see FIG. 15) as a response message in unicast to the host computer and the WS-Discovery provider 3021 receives this message.

Figure 13:
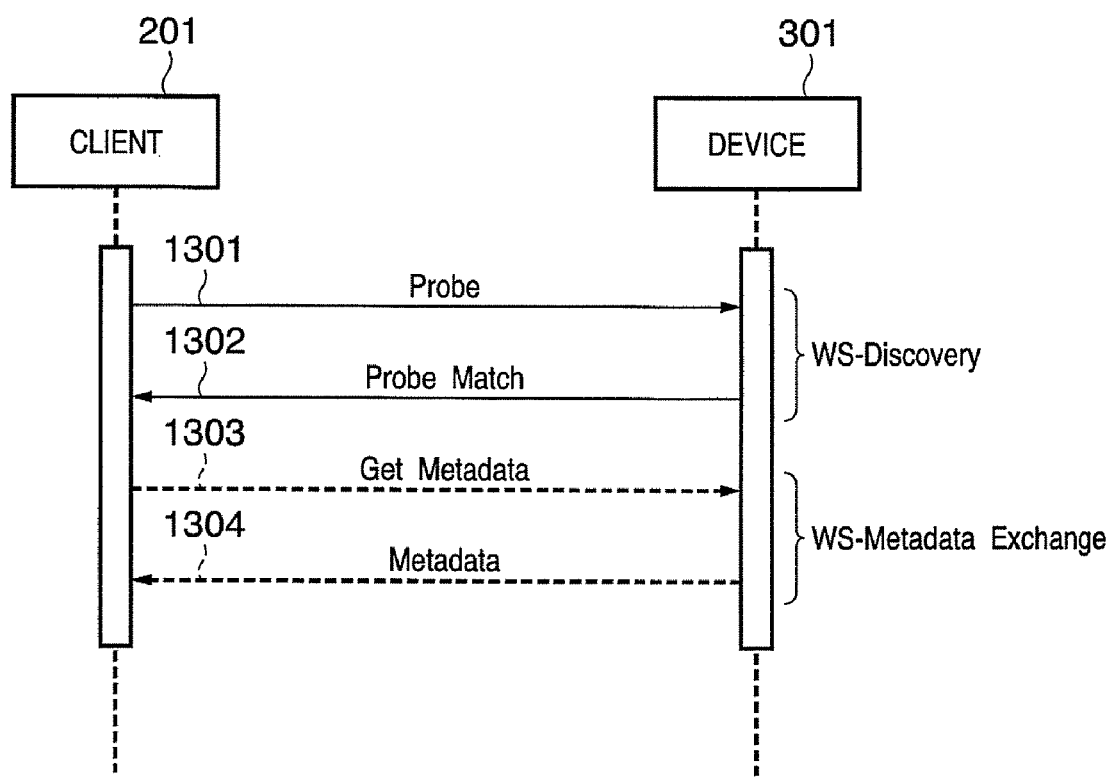
FIG. 13 is a view of a message sequence of Device Profile for Web Services, as an embodiment of the present invention.

A sequence for collecting device information beginning with the Probe is shown in FIG. 13. The client 201 first sends a Probe message 1301 in multicast to the network. The Probe message includes a message ID 1401 indicating that the message is a probe and a device type 1402 indicating the type of the device to be searched. In this example, because a search target is a printer, "PrintBasic" which denotes printer is described in the device type 1402 in FIG. 14.

Upon receiving the Probe 1401, the printer 301 sends a response with a ProbeMatch message 1302 back to the client 201. An example of the ProbeMatch message shown in FIG. 15 includes a device address 1501, a device type 1502, version information 1503, etc.

The client 201 sends a GetMetadata message 1303 shown in FIG. 16 to the printer 301, with the destination being the device indicated by the ProbeMatch message. Upon receiving the message, the printer 301 sends a GetMetadata Response message 1304 including metadata in which device information is included, to the client 201. The procedure may be a device searching procedure beginning with the Hello, by replacing the Probe and the ProbeMatch message in FIG. 13 with the Hello message from the device.

Although response of device information from the device having WSD function information has been described, a SSDP provider 3022 receives messages in the case of a device having UPnP function information. In addition, because the function discovery provider 302 can have a provider for each protocol, it is obvious that other providers deal with sending/receiving process for other protocols.

The description will be continued referring back to FIG. 3. Upon detecting the devices, the WS-Discovery provider 3021 notifies it to a function discovery client 303 (S3003). The function discovery client 303 lists the detected devices and notifies the list to an upper plug and play manager 304 along with the device information (S3004). As a matter of course, in this stage, the device information has been obtained as shown in FIG. 13. The listing of the devices is achieved by creating and storing information (a device list) in which detected device names (device IDs) are listed, for example. The detailed operation of the function discovery will be hereinafter described with respect to the FIGS. 7 to 12 and so on.

The plug and play manager 304 generally calls a class installer 306 based on the device information and the created device list which are obtained from the function discovery client 303 (S3007). The device driver which is necessary to use the device is installed by the class installer 306. The class installer 306 determines the type (class) of the device and accesses a driver database 307 in order to install the device. However, because the type of the device is here printer, the plug and play manager 304 first sends a message for directing a spooler 305 to create a new printer port, before calling the class installer 306. The spooler 305 creates the printer port through which the printer driver provides output to the printer 301. Then, the spooler 305 associates an NCD port monitor 3051, which is a port monitor for the network device, with the printer port and returns it to the plug and play manager 304 (S3006). The created printer port can be associated with the NCD port monitor 3051 because the printer 301 is the network device detected by the WS-Discovery. Then, the plug and play manager 304 calls the class installer 306.

The class installer 306 retrieves an installation information file (INF file) in which a hardware ID corresponding to the device ID included in the device information of the detected device is described, from the driver database 307. The INF file is a file which is used for installing a device driver and is stored in a storage unit of the host computer. The INF file is retained in the format of a file name including identification information and an identifier ".INF", after installing the device driver. For example, the INF file of the device driver which is firstly installed is stored in the format of "OEM1.INF". Then, the INF file of the device driver which is next installed is stored in the format of "OEM2.INF". Additionally, the INF file includes function information (for example, a page description language also referred to as PDL) for the device driver, etc. Therefore, by analyzing the INF file, it is possible to recognize characteristics of the device driver. Moreover, even if the device driver is uninstalled, the INF file corresponding to the device driver still remains in the storage unit of the host computer.

The device having the hardware ID corresponding to the device ID is determined to be the same device (that is, the device which can use the same driver). The hardware ID is an ID which is created by an enumerator in each category (PCI, USB, IP bus and so on) based on information such as the device ID obtained from the device. For example, if the hardware ID is configured to include the device ID, the hardware ID having the device ID part matching with the device ID of the detected device is the hardware ID corresponding to the device ID. In this way, by applying the same conversion to the device ID as that in creating the hardware ID, correspondence between the device indicated by the hardware ID and the device indicated by the device ID can be determined.

If an appropriate INF file is found as a result of the retrieval, a driver 308 described in the INF file is installed as the device driver for the detected new device (S3008). If any appropriate INF file is not found, a user interface of "add hardware wizard" is displayed. The user selects a driver according to the UI. The selected driver is installed (S3009). In FIG. 3, the driver in this case is supplied from an external medium 309 and duplicated and registered in the driver database 307.

<Function Discovery>

Figure 4:
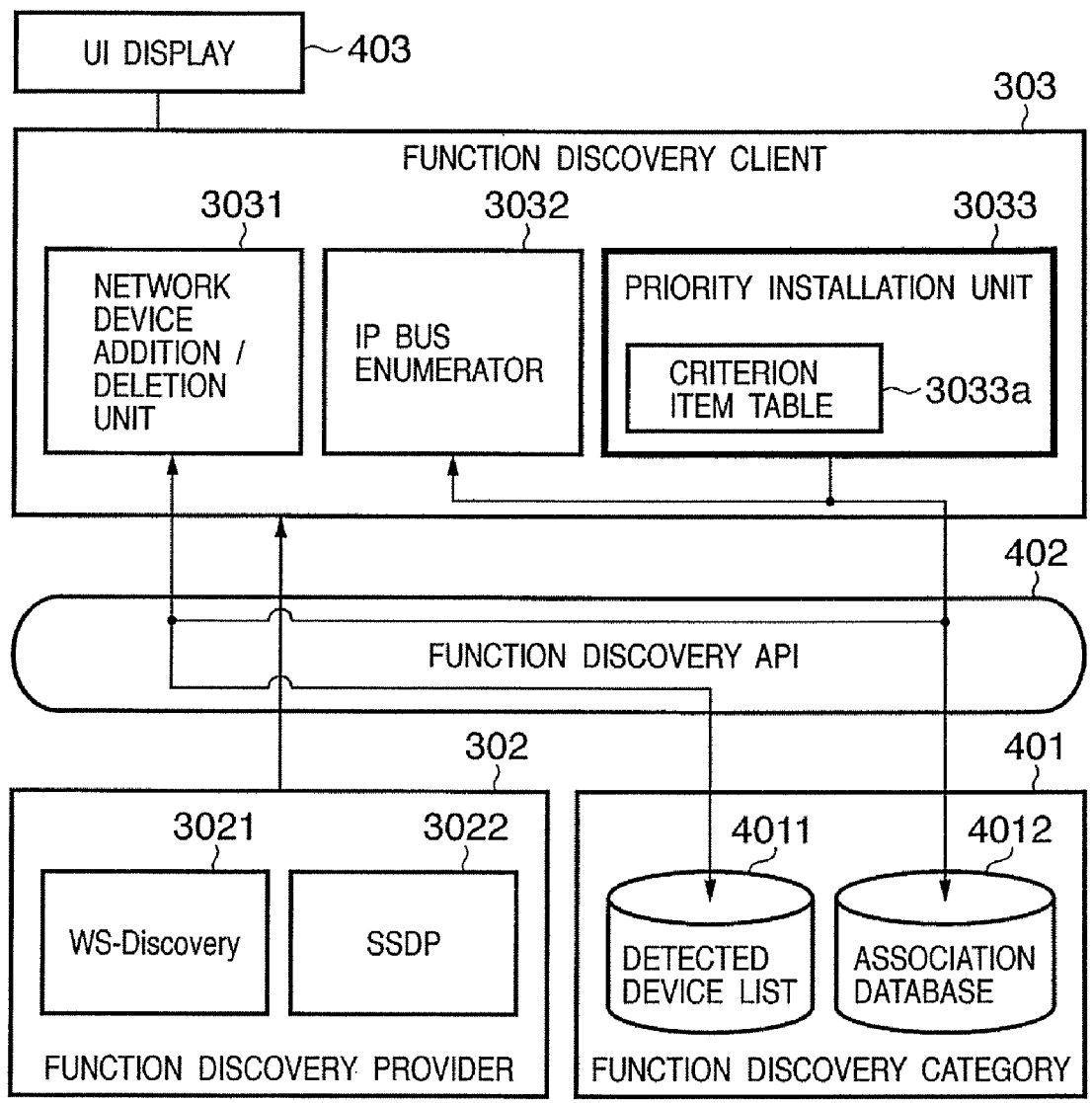
FIG. 4 is a detailed block view showing a function discovery unit in the network plug and play in FIG. 3, as an embodiment of the present invention.

Next, the function discovery in FIG. 4 will be explained. The function discovery is divided to the function discovery client 303 and the function discovery provider 302. They exchange data via a function discovery API 402 which is their common interface. The function discovery client 303 operates based on information that a function discovery category 401 has, in response to notification from the function discovery provider 302. In this embodiment, in the function discovery client 303, a priority installation unit 3033 is present in addition to an "network device addition/deletion" unit 3031 and an IP bus enumerator 3032. Further, a priority item table 3033a is included in the priority installation unit 3033. The network device addition/deletion unit 3031 is typically provided in the operating system as standard. For example, The Windows® OSs include this unit.

The device information received by the function discovery provider 302 is passed to the function discovery client 303. Based on the device information, the device is stored in the detected device list 4011 in the function discovery category 401.

Figure 5:
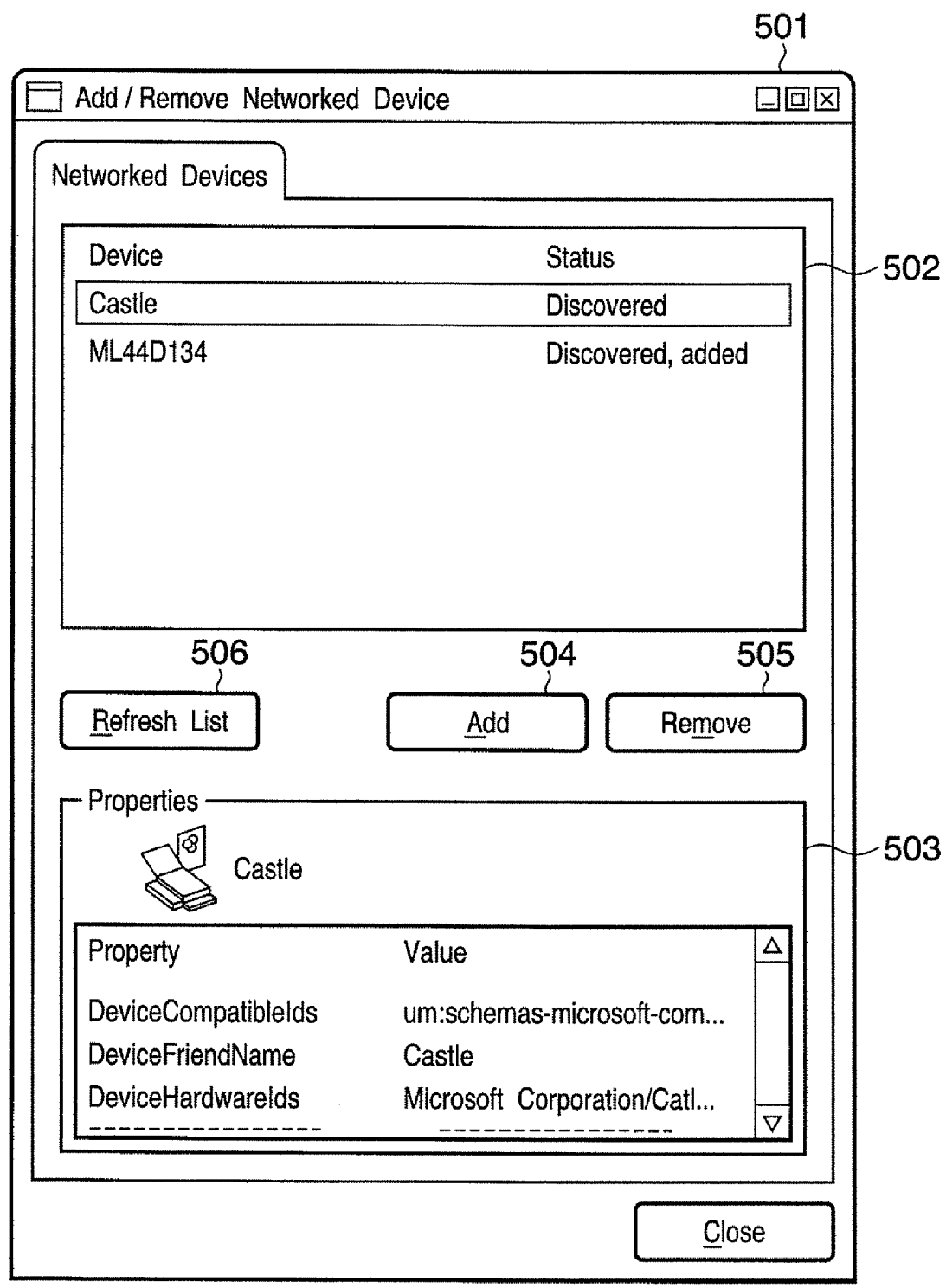
FIG. 5 is a view showing an example of a user interface of "add/delete network device" of the function discovery, as an embodiment of the present invention.

When the user selects the "add/delete network device" function from a control panel, a user interface 501 in FIG. 5 is displayed by the network device addition/deletion unit 3031. The network device addition/deletion unit 3031 displays a device list view 502 of the user interface in FIG. 5, based on the information (the device list) stored in the detected device list 4011. The device list view 502 includes device names and device statuses. Additionally, property information 503 can be displayed for the device selected from the device list view 502. The devices listed in the user interface (UI) 501 indicate the devices which are currently found on the network. The user selects a device to be used from the device list view 502, and presses an add button 504. The device information corresponding to the device now selected is specified from the detected device list 4011 and added to an association database 4012 in the function discovery category 401. The device information is the device information for metadata received by the function discovery provider 302. If the priority installation function as described later is executed without selecting any device in FIG. 5, the device information of all devices found on the network is registered in the association database 4012.

On the other hand, if a delete button 505 is pressed, the device information of the device now selected is deleted from the association database 4012. Because the device information is merely deleted from the association database 4012, the device remains to be displayed on the user interface 501. If an update list button 506 is pressed, the WS-Discovery provider 3021 in the function discovery provider 302 is notified that retry of the device searching procedure beginning with Probe message is performed. Then, a Probe message is again multicast to the network to search devices.

The IP bus enumerator 3032 lists the devices based on information registered in the association database 4012 in the function discovery category 401 and creates information (a device list) of the listed devices. The IP bus enumerator 3032 notifies the list to the upper plug and play manager 304. The plug and play manager 304 installs the device drivers based on the notified device list. The device list which is here notified to the plug and play manager 304 is generated based on the function information (PDL) specified in processes in FIGS. 7 to 11 as described later. Therefore, the devices which are the targets for driver installation by the network plug and play are not all devices detected on the network. The devices that are the targets for the network plug and play are the devices registered in the association database 4012 through the processes in FIGS. 7 to 11.

<Priority Installation Function>

Figure 6A:
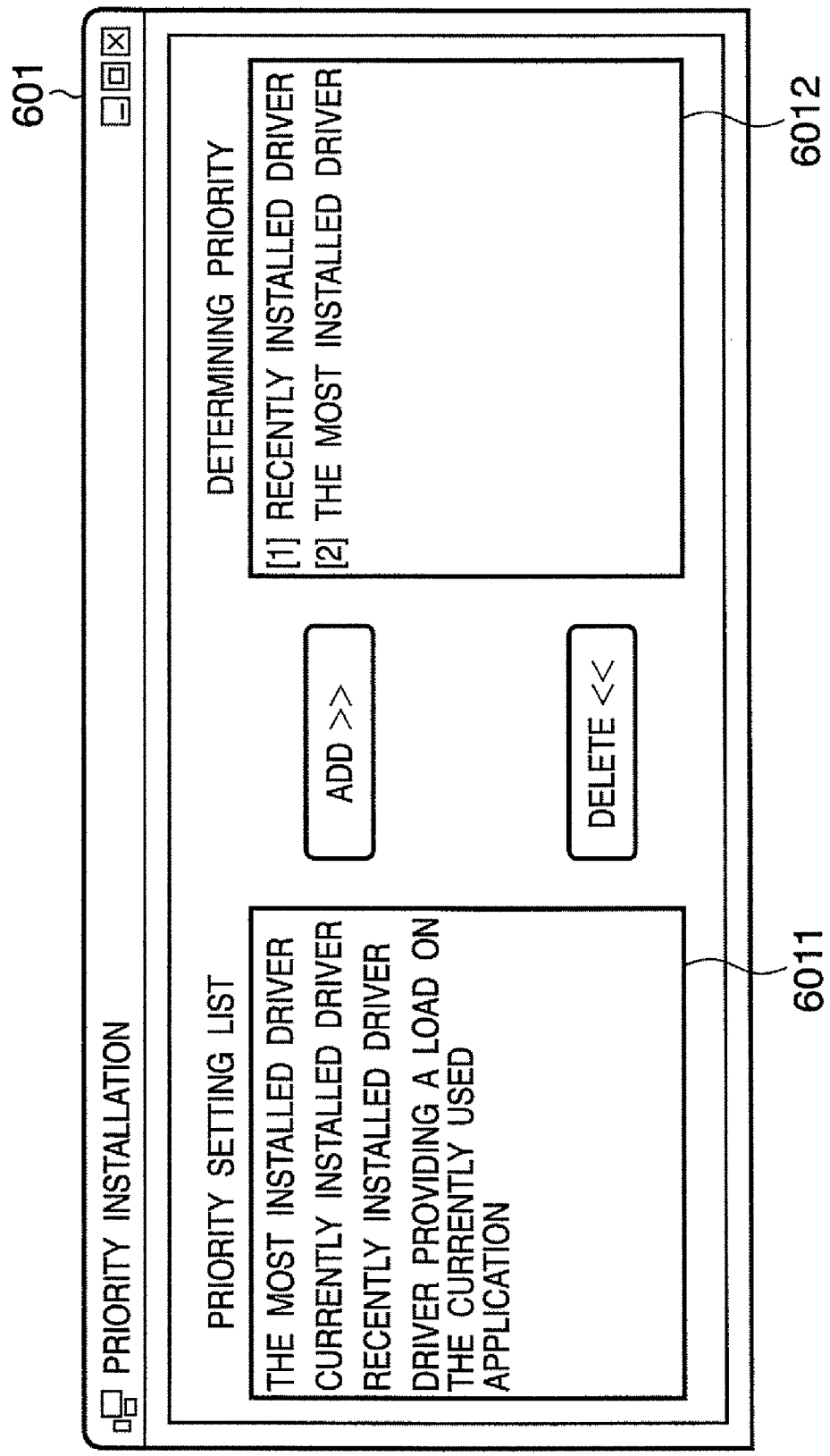
FIGS. 6A and 6B are views showing examples of user interfaces of "priority installation" of the function discovery, as an embodiment of the present invention.

Next, the function of the priority installation unit 3033 in the function discovery client will be explained with reference to user interfaces in FIGS. 6A and 6b and a flowchart in FIG. 7. The priority installation function is a function for selecting high priority function information according to a specified criterion and installing only the drivers corresponding to the selected high priority function information. In the following description, the targets for driver installation are printers. However, the present invention is applicable to devices other than printers which provide a plurality of function information and requires a driver for each function information, as is the case of printers.

The function of the priority installation unit 3033 is the core of this embodiment. The priority installation unit 3033 has the user interfaces as in FIGS. 6A and 6B. That is, it performs input/output processing to/from the user (operator) through the user interface 601 in FIG. 6A. The user starts the user interface 601 of the priority installation 3033. For example, a button for priority installation management is provided in the user interface 501 in FIG. 5 and if the button is pressed, the user interface 601 in FIG. 6A is displayed. The user selects an item (referred to as a criterion item) which will be a criterion in deciding drivers to be installed for function information, from a priority setting list 6011 on the user interface 601 in FIG. 6A. In other words, using the user interface in FIG. 6A, the user sets the criterion item for specifying the function information for the device driver to be installed when executing installation processing. In addition, the priority installation unit 3033 executes a process for specifying the function information based on the set criterion item, among the function information corresponding to driver information regarding a plurality of types of device drivers included in installation log information in the process in FIG. 7 as described later. For example, it is assumed that a printer detected on the network supports a plurality of types of PDLs. The device information of the printer includes information of each PDL (PDL information) as function information provided by the printer. In order to allow a client to use the function information, it is necessary to install the device driver corresponding to the function information. Thus, even if the user uses only one PDL, a device list created from the device information, which indicates that the detected printer supports a plurality of PDLs, is notified to the plug and play manager 304. Accordingly, the plug and play manager 304 installs the device drivers according to all PDLs supported by the printer. Therefore, the device drivers which are unnecessary for the user are also the targets to be installed. Thus, in such a case, the drivers are installed according to a priority provided to the selected criterion item. In the example in FIG. 6A, the priority setting list 6011 includes "most installed driver" and "currently installed driver". In addition, the priority setting list 6011 includes "recently installed driver", "optimal driver for currently used application" and "driver providing a low load on the network" and therefore includes a total of 5 criterion items as options.

Figure 6B:
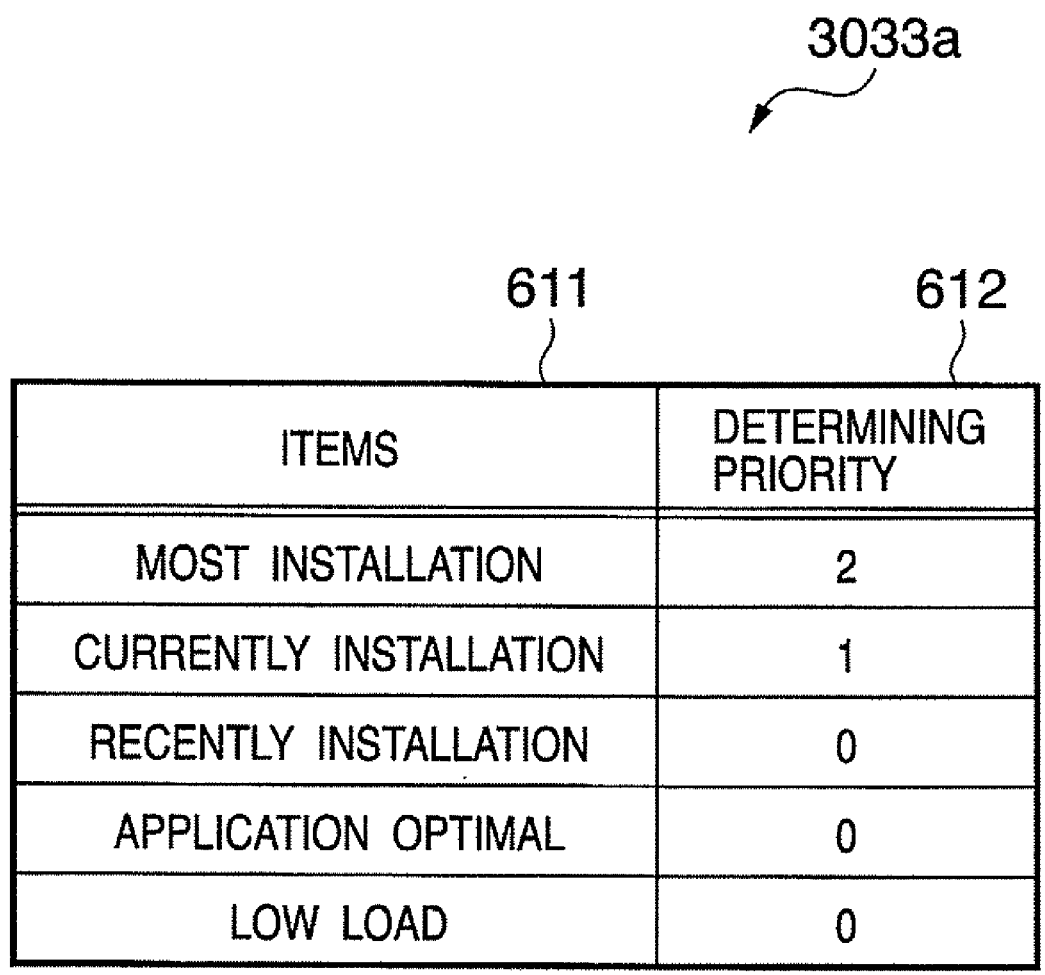

The selected criterion item is stored in a criterion item table 3033a shown in FIG. 6B. In the priority item table 3033a, an item name 611 and a determining priority 612 are associated with each other and stored for each criterion item. Although, for convenience, the item names are shown as names in the figure, they may be symbols or the like, as long as the program can read the IDs. The determining priority is provided according to the sequence in which the priority setting items are selected. For example, the determining priority of the firstly selected criterion item is 1. Further, in the example in FIG. 6B, 0 denotes that the item is not selected. In this example, it is assumed that the items which are not registered in the criterion item table 3033a also includes criterion items having determining priorities of 0.

Figure 7:
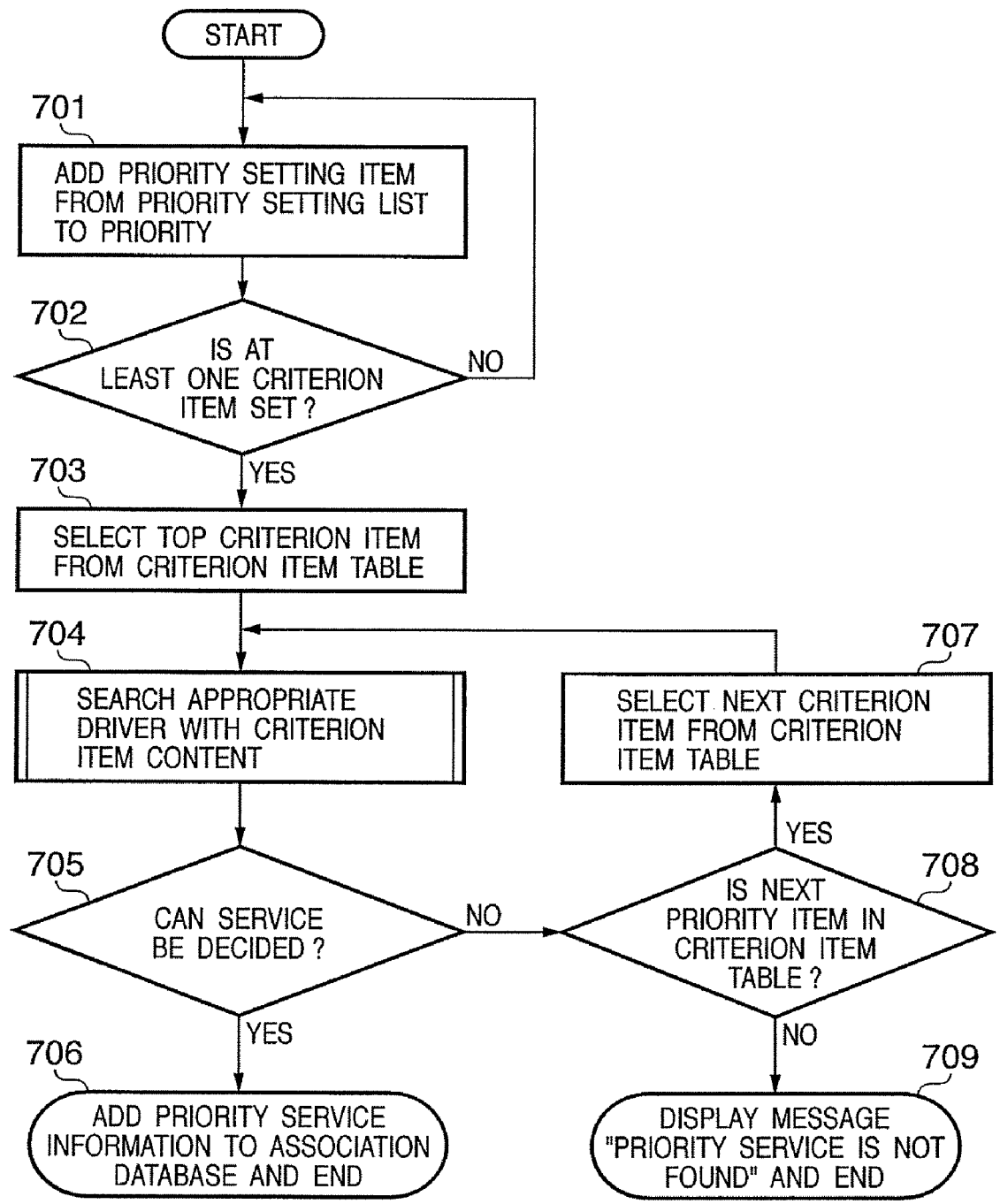
FIG. 7 is a flow chart showing a process flow of the priority installation, as an embodiment of the present invention.

FIG. 7 is a flowchart in executing the priority installation function. Processes in the flowcharts described in the present invention are executed by the CPU 101 of the host computer. In FIG. 7, the priority installation unit 3033 recognizes a criterion item selected by the user among the criterion items included in the priority list 6011 of the user interface 601 in order to register the determining priority. Then, the priority installation unit 3033 registers the priority of the selected criterion item to the criterion item table 3033a (Step 701). If it is desired to select a plurality of criterion items and decide the priority of the driver by sequencing the items, the user repeats the operation of selecting one criterion item and pressing the add button. After the items are added in this way, the selected criterion items are listed in the determining priority list 6012 in a sequenced manner. When pressing the delete button, the now selected criterion item is deleted from the determining priority list. Candidates for the criterion items are previously retained in the priority installation unit 3033. For example, the item names 611 of the criterion items have been registered in the criterion item table 3033a in FIG. 6B as described above, and the priority installation unit 3033 retains it. Then, the sequence in which the items are added is registered in the determining priority columns 612 for the criterion items added to the determining priority list 6012. Thereby, the selected criterion item and the determining priority can be registered in the criterion item table 3033a of the priority installation unit 3033.

When the user interface 601 is closed, the determining priority list is decided. That is, the determining priority is registered in the criterion item table 3033a. Next, the priority installation unit 3033 determines if the determining priority is registered in the criterion item table 3033a (Step 702). If the determining priority is registered to be 0, the priority installation unit 3033 determines that the determining priority is not registered. Therefore, if the determining priorities of all items are 0, the determination is "no" and the process branches to Step 701.

If at least one criterion item having a set determining priority is registered in the criterion item table, the priority installation unit 3033 first selects the criterion item for which the top priority is registered in the determining priority list 612 as a target criterion item (Step 703). In other words, it focuses attention on the criterion item for which the determining priority of 1 is registered in the criterion item table 3033a. Then, the priority installation unit 3033 searches information of the host computer with respect to the target criterion item and specifies a driver matching to the target criterion item (in other words, a function information to which the driver corresponds) (Step 704). That is, the priority installation unit 3033 selects one criterion item among the plurality of the criterion items in accordance with the registered determining priority. Then, the priority installation unit 3033 specifies function information based on the target criterion item, when the device driver compatible to the peripheral device recognized by the recognition function using WSD function is installed.

The priority installation unit 3033 determines a PDL (function information) corresponding to the device driver specified by Step 704 (Step 705). Specifically, the priority installation unit 3033 recognizes installation log information of the device driver retained in the computer. Then, the priority installation unit 3033 analyzes the function information (for example, a type of PDL) corresponding to the device driver information regarding an installed device driver, which is included in the recognized installation log information of the device driver. Then, the priority installation unit 3033 specifies the function information corresponding to a device driver to be installed. When the function information (for example, a type of PDL) is decided by the process in Step 705, a device driver corresponding to the function information (for example, a type of PDL) is installed. For this purpose, the priority installation unit 3033 adds the information (for example, PDL function information) for the driver to be installed into the association database 4012 in the function discovery category 401. For example, if a printer supports a plurality of types of PDLs, the priority installation unit 3033 decides a device driver to be installed among a plurality of types of device drivers supported by the peripheral device, based on the specified function information (for example, PDL). Thus, the priority installation unit 3033 detects the device driver corresponding to the specified function information among the plurality of types of the device drivers and decides it as the driver to be installed. For the printer comprising a plurality of function information (for example, supporting a plurality of types of PDLs), the priority installation unit 3033 deletes function information other than the function information corresponding to the driver which is decided to be installed (for example, PDL supported by the driver, referred to as high priority function information) (Step 706). Thus, the device information of the device selected in the UI 501 in FIG. 5 is registered in the association database 4012. If the selected device supports a plurality of PDLs, the device drivers respectively corresponding to the PDLs supported by the device are registered in the association database 4012. If the created device list is notified to the plug and play manager 304 in this state, all device drivers are installed. However, by executing the process in FIG. 7, device drivers other than the device driver corresponding to the PDL specified by S705 are deleted from the association database 4012, even if the device selected in the UI 501 supports a plurality of PDLs. That is, if the selected printer comprises a plurality of PDLs, the priority installation unit 3033 rewrites the device information as if the printer included only the specified PDL. In addition, device information other than that of the printer supported by the driver decided to be installed, is deleted from the association database 4012. For example, if all PDLs that printer has do not match with the high priority PDL (i.e. the PDL decided to be installed), the device information of the printer is deleted from the association database 4012. Information for associating the driver to the function information is included in the device information. For the device providing a plurality of function information, information for corresponding the driver and the function information is included for each function information. Then, the user interface is completed (706).

Thereafter, IP bus enumerator 3032 in the function discovery client 303 lists the devices registered in the association database 4012 in the function discovery category 401 and passes the list to the plug and play manager. Because the priority installation 3033 changes the association database 4012 in Step 706, the device information of the printer that the driver decided to be installed does not support, is not passed to the plug and play manager 304. Therefore, the plug and play manager 304 installs the driver corresponding to the PDL specified in the process in FIG. 7, by the plug and play function. Specifically, the plug and play manager 304 controls so that the device driver to be installed, which is decided in Step 705 in FIG. 7, is installed. Thus, the plug and play manager 304 directs the operation system to install the device driver corresponding to the specified function information. Drivers which do not relate to the PDL specified by the process in FIG. 7 are not installed. As a result, without changing the network plug and play system that the operating system has, automatic installation with plug and play can be achieved by specifying the driver corresponding to the PDL desired by the user.

For example, in the conventional network plug and play function, for a printer having a plurality of PDLs, drivers corresponding to the PDLs are installed. However, in this embodiment, because the drivers are selected in accordance with the criterion for selecting the drivers to be installed, only the drivers for the PDLs satisfying the criterion are installed.

On the other hand, if the drivers to be installed can not be decided, it is determined if any criterion item which is not yet considered remains in the criterion item table 3033a (708). If it remains, the item having the next determining priority is selected from the criterion item table 3033a (707). Then, attention is paid to the selected criterion item and information of the host computer is searched in accordance with the item content to decide the driver (704). In other words, if function information can not be specified based on the target criterion item, the process of sequentially changing the target criterion item in accordance with the set priority is repeated, until function information to be used in installation is specified. If it is determined that any criterion item which is not yet determined does not remain in the criterion item table 3033a in Step 708, a message "A high priority PDL is not found" is displayed on the user interface. Then, the priority installation unit 3033 ends the process in FIG. 7. In this case, the process operates in a similar way to the normal network plug and play.

In this way, the priority installation unit 3033 selects drivers to be installed for a device searched (thus recognized) from the network by the client issuing the Probe message. Then, in order to pass the information for specifying the selected drivers to the plug and play manager, the device information is processed.

Drivers to be installed for a device recognized by the device issuing the Hello message are also selected and installed, if the drivers fit to the criterion item. However, in this case, the target for driver installation by PnP is limited to the device which is newly recognized.

<Decision of High Priority Driver>

Next, Step 704 in FIG. 7 will be explained in detail with reference to FIGS. 8 to 12. As described above, the present invention addresses a problem that memory of a host computer is wasted in the result of that drivers associated to printers connected to the network are automatically installed, regardless of the intention of the user. Further, the present invention addresses a problem that a wrong device driver may be selected when the user actually selects a device driver, because a plurality of device drivers may be installed for one device. To solve these problems, it is an object of the present invention to specify function information (for example, PDL) in accordance with the preference of the user and automatically install the device drivers corresponding to the specified function information (for example, a type of PDL). For this purpose, in the present invention, function information (for example, a type of PDL) desired by the user is specified based on the installation log information for device drivers in the host computer. For example, if the PDL which has been most installed can be specified referring to the history information, it is conceivable that the user prefers to use the PDL. Therefore, automatic installation of the device driver reflecting the user preference can be achieved. The installation log information herein described includes the information for the device drivers which have been installed in the past with respect to the time of executing the automatic installation and now (at the time of executing the automatic installation). That is, it is the information for the device drivers which were installed before the time at which the plug and play manager 304 controls so that a device driver is installed. Further, the installation log information herein described includes the information for the device drivers which have been installed in the past with respect to the time of executing the automatic installation. That is, it is also the information for the device drivers which have been installed at the time at which the plug and play manager 304 controls so that a device driver is installed. Still further, the installation log information is the information for the device drivers which have been installed before or at the time at which the plug and play manager 304 controls so that a device driver is installed.

Because Step 704 is a different process for each target criterion item, it is firstly determined what the target criterion item is and then a process explained in any of FIGS. 7 to 12 is executed depending on the result of the determination.

(Most Installed Criterion)

Figure 8:
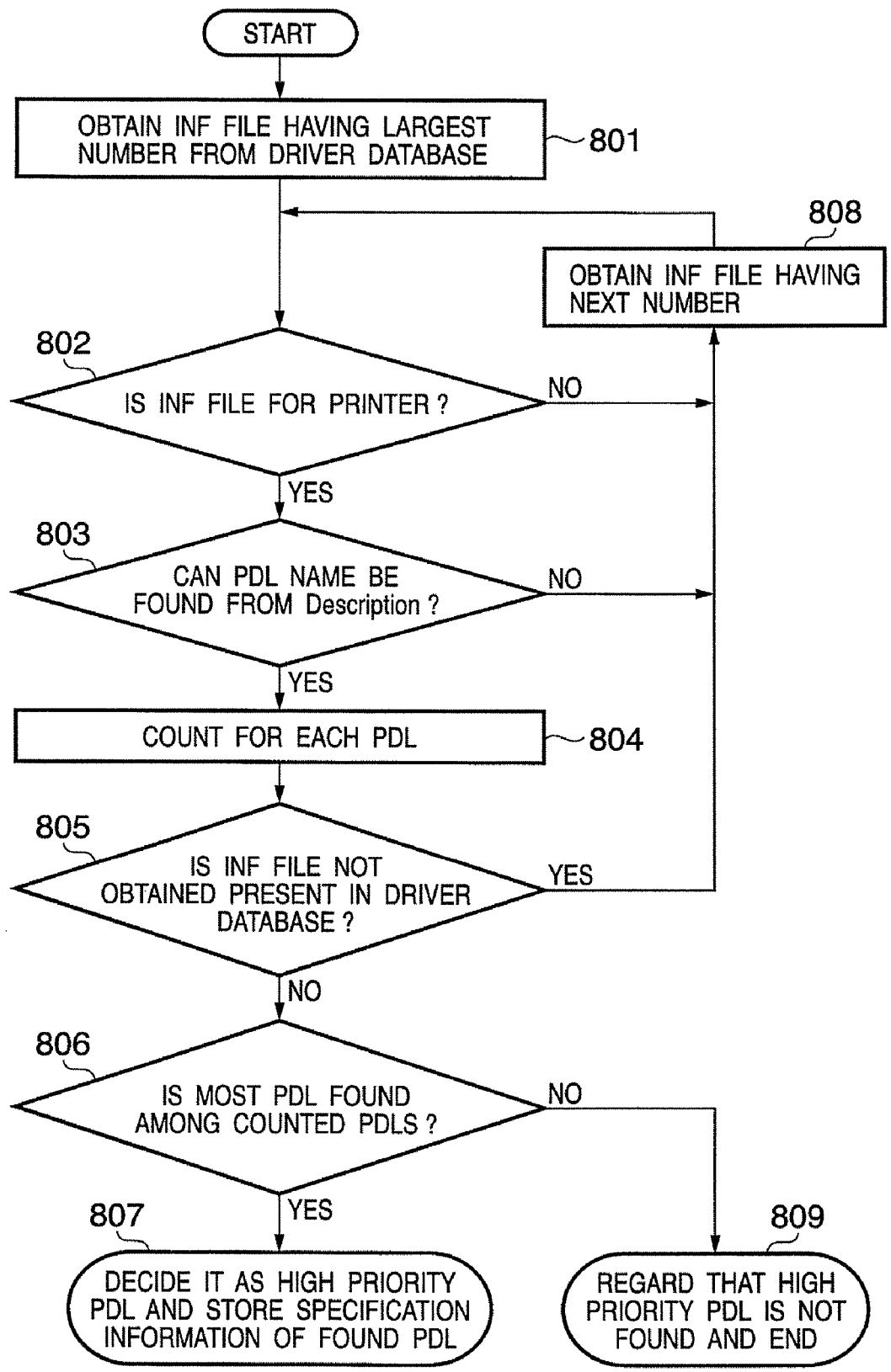
FIG. 8 is a flow chart showing a process flow of "most installed driver" among priority setting items of the priority installation, as an embodiment of the present invention.

FIG. 8 shows a driver deciding procedure in the case of the target criterion item being "most installed driver". This criterion item is, in other words, to select a device driver corresponding to the same type of function information as the most function information among the function information to which the device drivers installed in the client computer in the past relate. Therefore, the flowchart in FIG. 8 sets, for the criterion item, the information for installing the device driver corresponding to the most function information among the function information corresponding to the installed device driver information in the installation log information. Then, the priority installation unit 3033 automatically installs the device driver corresponding to the function information which has been most installed in the past. Although the target device is limited to printer and the function information is limited to PDL in Step 802 in the example in FIG. 8, the procedure in FIG. 8 is applicable to other devices and function information. The extension can be readily achieved by deleting Step 802 and regarding "PDL" in the figure as function information. This applies to FIGS. 9 and 10, also.

The drivers which were installed in the past are retained in the driver database 307 by the operating system, with their INF file names having numbers according to the sequence that the class installer 306 installed the drivers. This is achieved in Windows (R), for example. If the "most installed driver" is the target criterion item, the priority installation unit 3033 obtains the INF file having the largest number (that is, most recently installed) from the driver database 307 (801).

Next, referring to a Class entry of the INF file, the priority installation unit 3033 determines if the type of the device is printer (802). In the Class entry, information indicating the type of the device is recorded. If the priority installation unit 3033 determines that the INF file to be now determined denotes a printer, a PDL name is retrieved from Description of the INF file (803). After the PDL name is found, a counter corresponding to the PDL is incremented by 1. For the PDL name which appears for the first time, a counter value corresponding to the PDL is set to be 1. In this way, the priority installation unit 3033 counts the number of corresponding drivers for each PDL type (804).

The priority installation unit 3033 determines if any INF file which is not yet obtained is present in the driver database and, if present, obtains the next INF file (808) and repeats the same process. The PDL name includes Postscript (R), for example. Because such a kind of name is included in the Description of the INF file, the priority installation unit 3033 retrieves the PDL name which is previously prepared, from the INF file in Step 803.

After retrieving all INF files and counting the PDLs included in the INF files, the priority installation unit 3033 determines if the most PDL (that is, the PDL having the largest counter value) is uniquely decided. If uniquely decided, the priority installation unit 3033 decides the PDL having the largest counter value to be a high priority PDL (high priority function information). Then, the priority installation unit 3033 stores the information (high priority function information) for specifying the driver, such as an identifier of the decided PDL, in a memory or the like (807). If not uniquely decided, it is regarded that the high priority PDL is not found. Accordingly the information indicating the result is stored and the process ends (809). The high priority function information stored in Step 807 and the information stored in Step 809 are passed to Step 705 in FIG. 7 and used as information for determination.

By executing the process in FIG. 8, the PDL (function information) which was most installed in the past is specified and the device driver corresponding to the PDL is specified before the automatic installation is executed. As described above, because the INF file remains in the storage unit of the host computer even if the corresponding device driver is uninstalled, the automatic installation processing can be achieved reflecting the history of the device drivers installed in the past.

Here, the PDL which was most installed in the past is the PDL familiar to the user and the same output processing as before can be achieved. By setting such a criterion item, the device driver corresponding to the PDL matched to the user preference can be specified and installed. Therefore, memory waste due to installation of device drivers unnecessary for the user can be prevented. In addition, it is prevented to print with the PDL that the user does not intend to use, due to installation of device drivers unnecessary for the user.

(Currently Installed Criterion)

Figure 9:
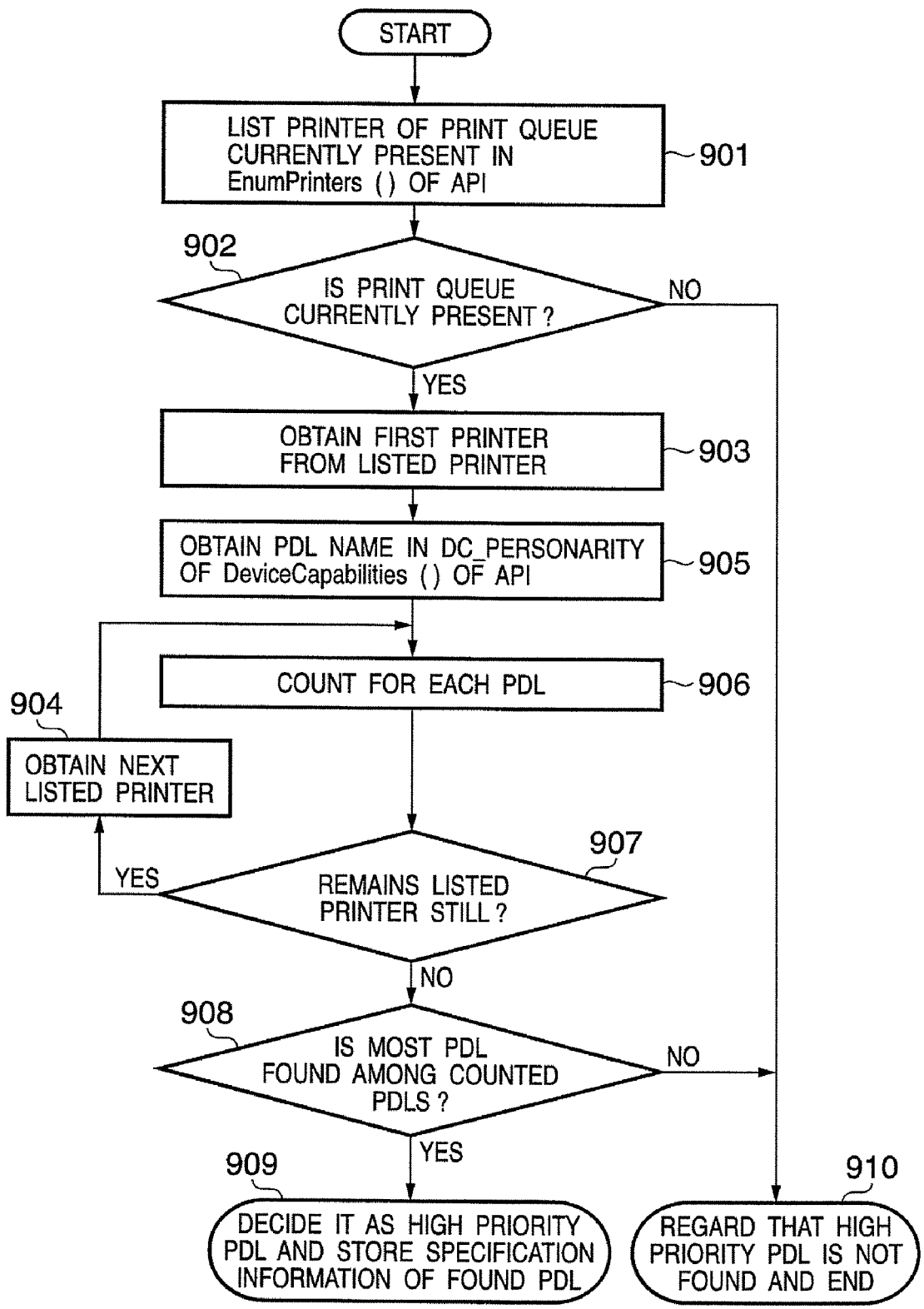
FIG. 9 is a flow chart showing a process flow of "currently installed driver" among the priority setting items of the priority installation, as an embodiment of the present invention.

FIG. 9 shows a driver deciding procedure in the case of the target criterion item being "currently installed driver". This criterion item is, in other words, to select a device driver corresponding to the same type of function information (for example, PDL) as the most function information (for example, PDL) among the function information (for example, PDL) of the device drivers currently installed. If the "most installed criterion" described above is the criterion item, the device drivers which were installed in the past are the target and therefore the device drivers which were already uninstalled are also the target to be counted. However, if the "currently installed criterion" is the criterion item, the device drivers which were already uninstalled are not the target to be counted. That is, the process in FIG. 9 is executed when information is set for installing the device driver corresponding to the same type of function information as the function information of the device driver which is currently installed in the computer, for the criterion item, in the installation log information.

In Windows (R), the printer drivers which are currently installed in the host computer are respectively assigned to objects referred to as print queues for retaining data to be printed. Firstly, the priority installation unit 3033 calls EnumPrinters ( ) that is an API of the operating system, in order to list printer drivers from all print queues (901). If no printer driver is here listed, then no printer queue is present. Thus, the priority installation unit 3033 determines if any print queue is currently present (902). If not present as the result of the determination, it can be determined that no appropriate driver is found as the high priority driver, i.e. "currently installed driver".

If any print queue is present, then the priority installation unit 3033 pays attention to the top printer driver among the listed printer drivers (903). The priority installation unit 3033 calls DeviceCapabilities ( ) that is an API of the operating system with an argument of DC_PERSONARITY, in order to obtain the driver capability for the target printer driver (905). The DC_PERSONARITY is a function for obtaining PDL names. The priority installation unit 3033 counts the PDL names which are here obtained (906). That is, a counter is provided for each PDL name and the counter corresponding to the name obtained in Step 905 is incremented by 1. If any listed printer drivers still remain (907), the priority installation unit 3033 pays attention to the next printer driver of the currently target printer driver (904). Then, the PDL name is obtained.

If the PDLs of all listed printers have been counted (907—no), the priority installation unit 3033 searches the PDL having the largest count value (908). If the most PDL can be uniquely decided, the priority installation unit 3033 decides the PDL to be the high priority PDL and stores the high priority function information for specifying the PDL, i.e. function information (909). If not, it is regarded the high priority PDL is not found. Accordingly, the information indicating the result is stored and the process ends (910).

By executing the process described in FIG. 9, the PDL which is most installed among the device drivers currently installed can be specified. For example, in FIG. 18, the device driver corresponding to the PDL1 is most installed. Therefore, it is conceivable that the PDL1 is the most necessary PDL for the user. The priority installation unit 3033 executes the installation processing, limiting to the device driver corresponding to the PDL1 among a plurality of types of the device drivers. In this way, by executing the process in FIG. 9, the PDL matched to the user preference is specified at the time of executing the installation processing. Then, the device driver corresponding to the specified PDL is the target to be automatically installed and only the device drivers matched to the user preference can be installed. Therefore, memory waste due to installation of device drivers unnecessary for the user can be prevented. In addition, it is prevented to print with the PDL that the user does not intend to use, due to installation of device drivers unnecessary for the user.

Further, although the process in FIG. 9 is described as a process for selecting device drivers corresponding to the same type of function information (for example, PDL) as the most function information (for example, PDL) among the function information (for example, PDL) corresponded to the device drivers currently installed, it is not necessary to limit to the process. The function information (for example, PDL) corresponded to the device drivers currently installed may be retained and the device drivers corresponding to the retained function information (for example, PDL) may be the targets to be automatically installed. It is assumed that a result as shown in FIG. 18 is obtained with this process, for example. In this case, 3 types of PDL drivers PDL1, PDL2 and PDL 3 are currently installed. Here, it can be considered that the currently installed PDLs are required by the user. Therefore, the priority installation unit 3033 can install the device drivers corresponding to the 3 types of PDLs required by the user at the time of executing the installation processing. Thus, the user can achieve output processing suited to the intended use.

(Recently Installed Criterion)

Figure 10:
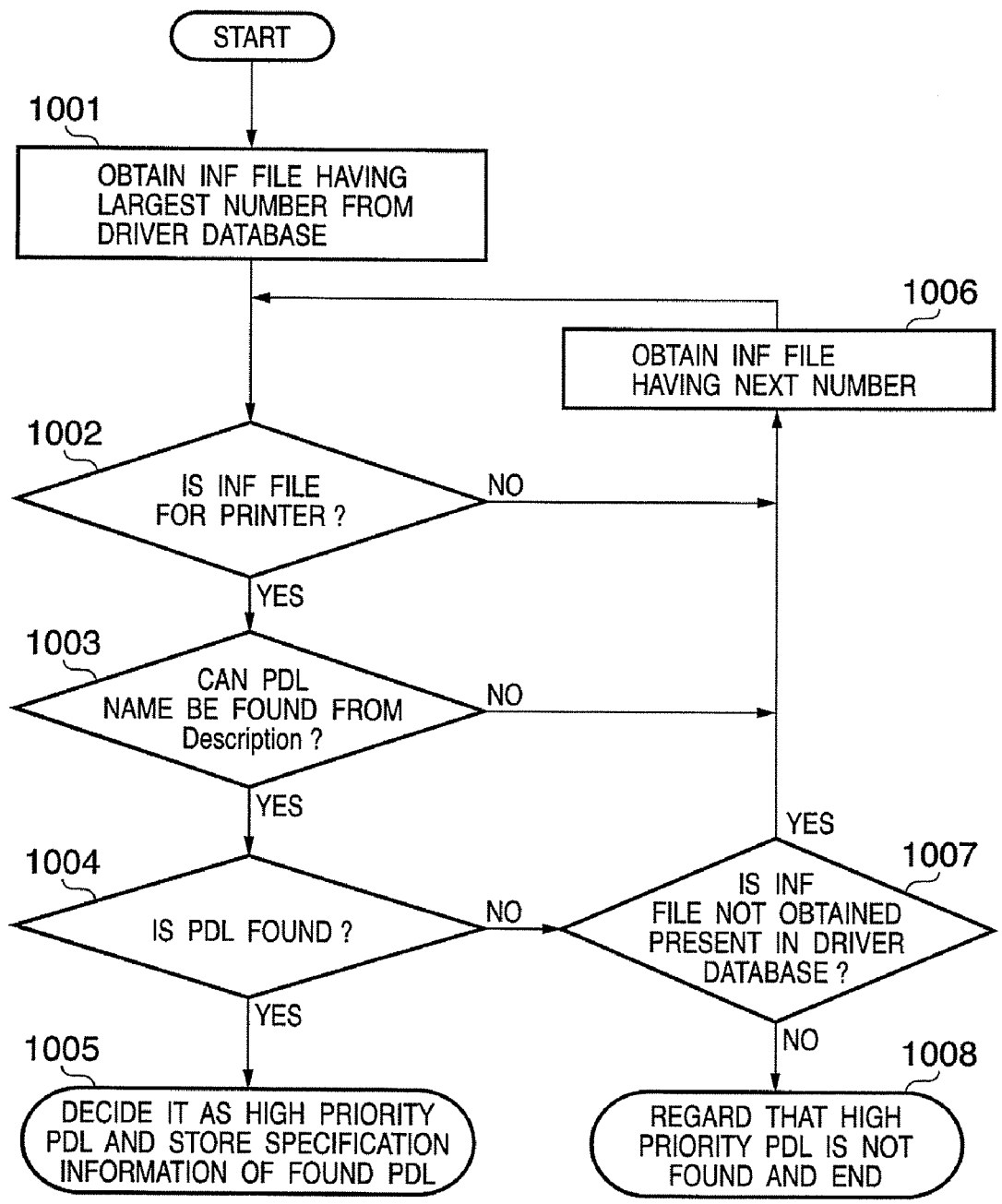
FIG. 10 is a flow chart showing a process flow of "recently installed driver" among the priority setting items of the priority installation, as an embodiment of the present invention.

FIG. 10 shows a driver deciding procedure in the case of the target criterion item being "recently installed driver". This criterion item is, in other words, to select a device driver corresponding to the same type of function information as the function information to which the device driver recently installed in the client computer relates. That is, the process in FIG. 10 is executed when information is set for installing the device driver corresponding to the same type of function information as the function information of the device driver which is finally (most recently) installed in the computer, for the criterion item, in the installation log information.

As described above, the drivers which were installed in the past are retained in the driver database 307 by the operating system, with their INF file names having numbers according to the sequence that the class installer 306 installed the drivers. The priority installation unit 3033 first obtains the INF file having the largest number (that is, most recently installed) from the driver database 307 (1001). Next, referring to a Class entry of the INF file, the priority installation unit 3033 determines if the type of the device is printer (1002). If it is printer, the priority installation unit 3033 retrieves a PDL name from Description of the INF file (1003). After the PDL name is found (1004), the priority installation unit 3033 decides the PDL to be the high priority PDL and stores the high priority function information for specifying the PDL, i.e. function information (1005). On the other hand, if the priority installation unit 3003 can not find the PDL name in the process 1004 (1004—No), then the priority installation unit 3003 obtains the INF file having the next largest number (1006) and repeats the same process again. If all INF files have been retrieved and no more file is found, then the process ends. In this case, the information indicating that no appropriate driver is present is stored and passed to Step 705 in FIG. 7 (1008).

By executing the process in FIG. 10, the PDL corresponding to the device driver that the user recently installed can be specified so as to automatically install only the device driver corresponding to the PDL. Therefore, the device driver can be installed while specifying the PDL which reflects the latest user preference at the time of executing installation processing.

(Optimal Application Criterion)

Next, a PDL detecting method in the case of the target criterion item being "optimal driver for currently used application" will be explained in conjunction with a database view in FIG. 11. The database in FIG. 11 can be considered as association information showing association between a device driver and a criterion item value. This applies to FIG. 12, also.

The procedure in this example is very simple and a flow of the procedure is omitted. The priority installation unit 3033 previously retains a PDL database for applications as shown in FIG. 11 which includes application names and optimal PDL names for the applications on a table. The priority installation unit 3033 scans an external storage device such as a hard disk to searches the applications currently installed. For example, because the installed application names are registered in a registry managed by the operating system, the names can be obtained. Using the name here obtained, the database in FIG. 11 is retrieved. If a hit is found as a result of the retrieval, or if the application registered in the database has been installed, counting is executed for the PDL name corresponding to the application name in the database 1101. This is repeated for all installed applications. After counting of the corresponding PDLs for all applications is completed, then the PDL having the largest count value is the high priority PDL. Then, it is determined if the PDL having the largest counter value can be uniquely decided. If uniquely decided, the PDL is decided to be the high priority PDL and the high priority function information for specifying the PDL, i.e. function information is stored. If not, it is regarded that no PDL is found. Accordingly, the information indicating that no appropriate driver is present is stored and passed to Step 705 in FIG. 7.

(Network Load Criterion)

Next, a PDL detecting method in the case of the target criterion item being "driver providing a low load on the network" will be explained in conjunction with a database view in FIG. 12. In the 4 criteria described above, the driver corresponding to the PDL decided to be the high priority function information is selected to be the target for plug and play. On the contrary, in the network load criterion, the driver providing a low load on the network is selected to be the target for PnP, among the drivers of the PDLs supported by the printers searched in the procedure as shown in FIG. 13. Therefore, depending on printers, a driver for a different type of PDL may be the target for PnP. In this example, the load on the network is indicated by spool file size.

The priority installation unit 3033 previously retains a database 1201 as shown in FIG. 12 which has spool file sizes and PDL names of the PDL data which are output when printing certain sample data, on a table. Thus, the spool sizes in the database 1201 denote the ratio of the spool file required by each type of PDL. As a matter of course, because the ratio can vary depending on data content to be printed, it is desirable that sample data is data including data types with the ratio in actual printing.

The priority installation unit 3033 first obtains device information of the searched printer from the association database 4012 in the function discovery category 401. Referring to the function information included in the device information, a printer having a plurality of PDLs as function information is retrieved. If any appropriate device information is present, its PDL names are compared with the PDL list in the database 1201. Then, the PDL having the smallest spool size is selected from the database 1201, among the PDLs included in the device information. Information indicating the selected PDL is passed to Step 705 in FIG. 7 as the high priority function information. If the PDL can not be uniquely decided, it is regarded that no PDL is found and the process ends.

As explained above with reference to FIGS. 7 to 12, in installing the device drivers with the network plug and play, the high priority function information is selected in accordance with a certain criterion, using the installation log information. The driver corresponding to the selected function information is installed in the computer. Therefore, it can be prevented that the drivers corresponding to all function information of all devices connected to the network are installed. Particularly, in this embodiment, a computer which can communicate with a printer supporting a plurality of types of PDLs as a plurality of function information (for example, a peripheral device supporting a plurality of types of device drivers) executes installation processing for drivers of not all PDLs. Only the drivers of the PDLs selected in accordance with the above described certain criterion are installed. Therefore, when printing is executed, it can be prevented to print with the driver corresponding to the PDL that the user does not intend to use, which contributes to enhancement of a selecting operation in driver selection by the user. In this way, the process for specifying function information herein described is executed when a predetermined message is obtained from a peripheral device connected to the network and a message is obtained which indicates that the device supports to a plurality of types of device drivers.

Further, the user can specify the criterion for deciding the driver to be installed. Therefore, the user can indirectly select the driver to be installed by selecting the criterion which is most suitable to the user's own usage environment.

In FIGS. 8 to 12, it has been described how the function of the device including a plurality of PDLs is preferentially installed. However, this is not limited to PDL. For example, if a multifunction device has functions of FAX, printer and scanner, the above described approach may be replaced with an approach of installing only the drivers of FAX and printer. In this case, PDL may be replaced with function information. The function information provided by the device can be specified from the function information which can be obtained from the device with GetMetadata message. Although it has been explained that the function information is included in the device information in this embodiment, the present invention is applicable to a system in which the function information is obtained in a sequence different from that of the device information.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a unit of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a unit of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-303710 filed on Oct. 18, 2005, which is hereby incorporated by reference herein in its entirety.

What is claimed is:

1. An information processing apparatus which can communicate with a peripheral device supporting a plurality of types of device drivers, the apparatus comprising:

a recognition unit, adapted to recognize installation log information of device drivers retained;

a specification unit, adapted to specify function information which is a target for installation, by analyzing function information corresponded to installed device driver information which is included in the installation log information of the device drivers recognized by said recognition unit;

a decision unit, adapted to decide the device driver to be installed among a plurality of types of the device drivers supporting said peripheral device, based on the function information specified by said specification unit; and an installation control unit, adapted to install the device driver decided by said decision unit, wherein said units are implemented at least in part by a hardware CPU of the information processing apparatus.

2. The information processing apparatus according to claim 1, further a comprises setting unit, adapted to set a criterion item for specifying the function information of the device driver to be installed in executing said installation processing, wherein said specification unit is adapted to specify the function information based on the criterion item which is set by said setting unit, among the function information corresponding to the plurality of types of device driver information included in said installation log information.

3. The information processing apparatus according to claim 2, wherein said setting unit is adapted to set, for said criterion item, information for installing the device driver corresponding to the most function information, among the function information corresponding to the installed device driver information in said installation log information.

4. The information processing apparatus according to claim 2, wherein said setting unit is adapted to set, for said criterion item, information for installing the device driver corresponding to the same type of function information as the function information of the device driver currently installed in the information processing apparatus, in said installation log information.

5. The information processing apparatus according to claim 2, wherein said setting unit is adapted to set, for said criterion item, information for installing the device driver corresponding to the same type of function information as function information of the device driver most recently installed in said information processing apparatus in said installation log information.

6. The information processing apparatus according to claim 2, wherein said setting unit is adapted to set a priority for a plurality of the criterion items, said specification unit is adapted to pay attention to one criterion item in accordance with said priority among said plurality of criterion items and specifies the function information based on said target criterion item when installing the device driver supporting the peripheral device recognized by said recognition function, and if said function information can not be specified based on said target criterion item, a process is repeated in which the target criterion item is sequentially changed in accordance with said set priority until the function information used when installing is specified.

7. The information processing apparatus according to claim 1, wherein said device includes a printer and said function information is a page description language interpretable by the printer.

8. The information processing apparatus according to claim 1, wherein said installation log information is information for the device drivers which were installed before the time of controlling so that the device driver is installed.

9. The information processing apparatus according to claim 1, wherein said installation log information includes information for the device drivers which have been installed at the time of controlling so that the device driver is installed.

10. The information processing apparatus according to claim 1, wherein said installation log information is information for the device drivers which were installed before the time of controlling so that the device driver is installed, or information for the device drivers which have been installed at the time of controlling so that the device drivers is installed.

11. The information processing apparatus according to claim 1, further comprises an obtaining unit, adapted to obtain a predetermined message from the peripheral device connected to the network, wherein said specification unit is adapted to execute said specification process if a message indicating that the device supports the plurality of types of the device drivers is obtained by said obtaining unit.

12. The information processing apparatus according to claim 1, wherein said installation control unit is adapted to direct an operation system to install the device driver corresponding to the function information specified by said specification unit.

13. A method for controlling an information processing apparatus which can communicate with a peripheral device supporting a plurality of types of device drivers, the method comprising:

a recognition step of recognizing installation log information of device drivers retained;

a specification step of specifying function information which is a target for installation, by analyzing function information corresponded to installed device driver information which is included in the installation log information of the device drivers recognized in said recognition step;

a decision step of deciding the device driver to be installed among a plurality of types of the device drivers supporting said peripheral device, based on the function information specified in said specification step; and an installation control step of controlling so that the device driver decided in said decision step is installed.

14. The function information providing method according to claim 13, wherein the method further comprises a setting step of setting a criterion item for specifying the function information of the device driver to be installed in executing said installation processing, and said specification step specifies the function information based on the criterion item which is set in said setting step, among the function information corresponding to the plurality of types of device driver information included in said installation log information.

15. The function information providing method according to claim 14, wherein said setting step sets, for said criterion item, information for installing the device driver corresponding to the most function information, among the function information corresponding to the installed device driver information in said installation log information.

16. The function information providing method according to claim 14, wherein said setting step sets, for said criterion item, information for installing the device driver corresponding to the same type of function information as the function information of the device driver currently installed in the information processing apparatus, in said installation log information.

17. The function information providing method according to claim 14, wherein
said setting step sets, for said criterion item, information for installing the device driver corresponding to the same type of function information as function information of the device driver most recently installed in said information processing apparatus in said installation log information.

18. The function information providing method according to claim 14, wherein
said setting step sets a priority for a plurality of the criterion items,
said specification step pays attention to one criterion item in accordance with said priority among said plurality of criterion items and specifies the function information based on said target criterion item when installing the device driver supporting the peripheral device recognized by said recognition function, and
if said function information can not be specified based on said target criterion item, a process is repeated in which the target criterion item is sequentially changed in accordance with said set priority until the function information used when installing is specified.

19. The function information providing method according to claim 13, wherein said device includes a printer and said function information is a page description language interpretable by the printer.

20. The function information providing method according to claim 13, wherein said installation log information is information for the device drivers which were installed before the time of controlling so that the device driver is installed.

21. The function information providing method according to claim 13, wherein said installation log information includes information for the device drivers which have been installed at the time of controlling so that the device driver is installed.

22. The function information providing method according to claim 13, wherein said installation log information is information for the device drivers which were installed before the time of controlling so that the device driver is installed, or information for the device drivers which have been installed at the time of controlling so that the device drivers is installed.

23. The function information providing method according to claim 13, wherein
the method further comprises an obtaining step of obtaining a predetermined message from the peripheral device connected to the network, and
said specification step executes said specification process if a message indicating that the device supports the plurality of types of the device drivers is obtained in said obtaining step.

24. The function information providing method according to claim 13, wherein said installation control step directs an operation system to install the device driver corresponding to the function information specified in said specification step.

25. A non-transitory computer readable recording medium storing a program that when executed by a computer in an information processing apparatus which can communicate with a peripheral device supporting a plurality of types of device drivers, causes the computer to implement a method comprising the steps of:

a recognition step of recognizing installation log information of device drivers retained in the information processing apparatus;
a specification step of specifying function information which is a target for installation, by analyzing function information corresponded to installed device driver information which is included in the installation log information of the device drivers recognized in said recognition step;
a decision step of deciding the device driver to be installed among a plurality of types of the device drivers supporting said peripheral device, based on the function information specified in said specification step; and
an installation control step of controlling so that the device driver decided in said decision step is installed.

26. The non-transitory computer readable recording medium according to claim 25, wherein
the method further comprises a setting step of setting a criterion item for specifying the function information of the device driver to be installed in executing said installation processing, and
said specification step specifies the function information based on the criterion item which is set in said setting step, among the function information corresponding to the plurality of types of device driver information included in said installation log information.

27. The non-transitory computer readable recording medium according to claim 26, wherein
said setting step sets, for said criterion item, information for installing the device driver corresponding to the most function information, among the function information corresponding to the installed device driver information in said installation log information.

28. The non-transitory computer readable recording medium according to claim 26, wherein
said setting step sets, for said criterion item, information for installing the device driver corresponding to the same type of function information as the function information of the device driver currently installed in the information processing apparatus, in said installation log information.

29. The non-transitory computer readable recording medium according to claim 26, wherein
said setting step sets, for said criterion item, information for installing the device driver corresponding to the same type of function information as function information of the device driver most recently installed in said information processing apparatus in said installation log information.

30. The non-transitory computer readable recording medium according to claim 26, wherein
said setting step sets a priority for a plurality of the criterion items,
said specification step pays attention to one criterion item in accordance with said priority among said plurality of criterion items and specifies the function information based on said target criterion item when installing the device driver supporting the peripheral device recognized in said recognition function, and
if said function information can not be specified based on said target criterion item, a process is repeated in which the target criterion item is sequentially changed in accordance with said set priority until the function information used when installing is specified.

31. The non-transitory computer readable recording medium according to claim 25, wherein said device includes a printer and said function information is a page description language interpretable by the printer.

32. The non-transitory computer readable recording medium according to claim 25, wherein said installation log information is information for the device drivers which were installed before the time of controlling so that the device driver is installed.

33. The non-transitory computer readable recording medium according to claim 25, wherein said installation log information includes information for the device drivers which have been installed at the time of controlling so that the device driver is installed.

34. The non-transitory computer readable recording medium according to claim 25, wherein said installation log information is information for the device drivers which were installed before the time of controlling so that the device driver is installed, or information for the device drivers which have been installed at the time of controlling so that the device drivers is installed.

35. The non-transitory computer readable recording medium according to claim 25, wherein the method further comprises an obtaining for step of obtaining a predetermined message from the peripheral device connected to the network, and said specification step executes said specification process if a message indicating that the device supports the plurality of types of the device drivers is obtained in said obtaining step.

36. The non-transitory computer readable recording medium according to claim 25, wherein said installation control step directs an operation system to install the device driver corresponding to the function information specified in said specification step.

* * * * *